(12) United States Patent
Kuwahara et al.

(10) Patent No.: US 8,023,200 B2
(45) Date of Patent: Sep. 20, 2011

(54) MOVABLE BODY DRIVING MECHANISM

(75) Inventors: Takumi Kuwahara, Nara (JP); Hiroyasu Fujinaka, Osaka (JP)

(73) Assignee: Panasonic Corporation, Osaka (JP)

( * ) Notice: Subject to any disclaimer, the term of this patent is extended or adjusted under 35 U.S.C. 154(b) by 896 days.

(21) Appl. No.: 12/027,610

(22) Filed: Feb. 7, 2008

(65) Prior Publication Data
US 2008/0190241 A1 Aug. 14, 2008

(30) Foreign Application Priority Data
Feb. 8, 2007 (JP) .................................. 2007-028935

(51) Int. Cl.
*G02B 15/14* (2006.01)
(52) U.S. Cl. .................. 359/694; 359/699; 359/700
(58) Field of Classification Search .......... 359/694–704, 359/811–823
See application file for complete search history.

(56) References Cited

U.S. PATENT DOCUMENTS

| 5,805,353 A | 9/1998 | Ichino et al. |
| 2002/0005993 A1* | 1/2002 | Koiwai .......................... 359/700 |
| 2003/0002173 A1 | 1/2003 | Koiwai et al. |

FOREIGN PATENT DOCUMENTS

| EP | 1 033 599 A1 | 9/2000 |
| JP | 5-29013 | 4/1993 |

* cited by examiner

*Primary Examiner* — Mohammed Hasan
(74) *Attorney, Agent, or Firm* — Hamre, Schumann, Mueller & Larson, P.C.

(57) ABSTRACT

The present invention is directed to a movable body driving mechanism including a first frame and a second frame that is capable of moving relative to the first frame. The movable body driving mechanism includes a cam groove that is formed in the first frame, and a cam follower that is formed in the second frame and inserted movably in the cam groove. The cam groove includes a plurality of regions having different widths. The cam follower is formed to have a shape with a plurality of outer diameters, and different parts of the cam follower contact an inner lateral surface of the cam groove in each of the plurality of regions. With this configuration, the lateral surface of the cam follower can be made to contact the lateral surface of the cam groove constantly, thus achieving the cam driving without looseness. Also, since the biasing means or the like is not needed, it is possible both to simplify the configuration and to reduce the number of manufacturing steps.

2 Claims, 9 Drawing Sheets

MOVABLE BODY DRIVING MECHANISM

BACKGROUND OF THE INVENTION

1. Field of the Invention

The present invention relates to a movable body driving mechanism. In particular, the present invention relates to a movable body driving mechanism capable of expanding and retracting a movable body by cam driving. This movable body driving mechanism is applicable to a lens barrel or the like.

2. Description of Related Art

In recent years, a lens and a barrel mounted in an imaging apparatus such as a digital camera or a video camera can be moved along an optical axis direction by a cam mechanism formed in the barrel. In such an imaging apparatus, in order to obtain a high quality optical image, it is necessary to move the lens with high accuracy and restrict the lens position.

JP 5(1993)-29013 U discloses a configuration including a biasing means for biasing a cam follower toward a cam groove, in which a tip portion of the cam follower is made to contact an inclined surface of the cam groove constantly, thus avoiding the looseness of a lens frame.

However, since the configuration disclosed in JP 5(1993)-29013 U requires the biasing means, the number of manufacturing steps increases inevitably.

SUMMARY OF THE INVENTION

It is an object of the present invention to provide a movable body driving mechanism whose simple configuration achieves cam driving without looseness and allows easy manufacturing.

The movable body driving mechanism according to the present invention includes a first frame, and a second frame that is capable of moving relative to the first frame. The movable body driving mechanism includes a cam groove that is formed in the first frame, and a cam follower that is formed in the second frame and inserted movably in the cam groove. The cam groove includes a plurality of regions having different widths. The cam follower is formed to have a shape with a plurality of outer diameters, and different parts of the cam follower contact an inner lateral surface of the cam groove in each of the plurality of regions.

In accordance with the present invention, a lateral surface of the cam follower can be made to contact a lateral surface of the cam groove constantly, thus achieving the cam driving without looseness. Also, since the biasing means or the like is not needed, it is possible both to simplify the configuration and to reduce the number of manufacturing steps.

DETAILED DESCRIPTION OF THE INVENTION

Embodiment

1. Configuration of the Imaging Apparatus

Figure 1:
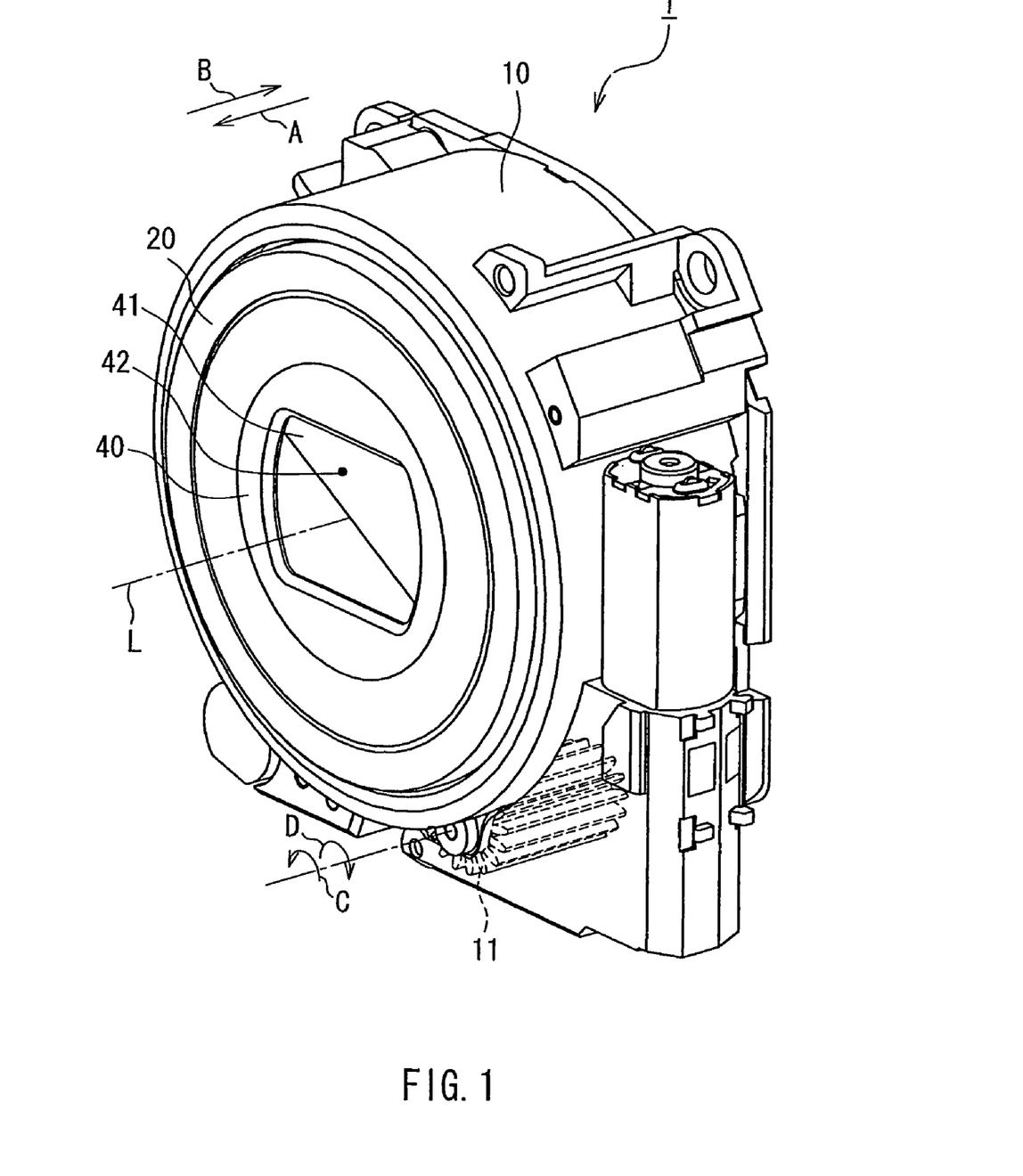
FIG. 1 is a perspective view showing an imaging apparatus including a movable body driving mechanism in the present embodiment.

FIG. 1 illustrates an example of an apparatus including a movable body driving mechanism in the present embodiment. The apparatus shown in FIG. 1 is an imaging apparatus mounted in a digital camera. An imaging apparatus 1 includes various lenses such as a zoom lens and a focus lens, an imaging device that converts incident light into an electric signal and outputs this signal, etc. It should be noted that the imaging apparatus illustrated in the present embodiment merely is an example and can be mounted in not only the digital camera but also a video camera or the like.

In the imaging apparatus 1, a fixed frame 10, a drive frame 20 and a first group unit 40 are arranged at coaxial positions. Further, a gear 11 is disposed near the fixed frame 10. The gear 11 is driven rotationally by a driving means such as a motor. The drive frame 20 and the first group unit 40 are configured to be moved in a direction indicated by an arrow A by rotating the gear 11 in a direction indicated by an arrow C and moved in a direction indicated by an arrow B by rotating the gear 11 in a direction indicated by an arrow D. FIG. 1 shows the imaging apparatus 1 in the state where the drive frame 20 and the first group unit 40 are received in the fixed frame 10 (in the following, referred to as a collapsed state), and the drive frame 20 and the first group unit 40 can be expanded in the direction indicated by the arrow A by rotating the gear 11. Also, an end face of the first group unit 40 is provided with a plate-like lens barrier 41. The lens barrier 41 can open or close an opening 42 of the first group unit 40.

Figure 2:
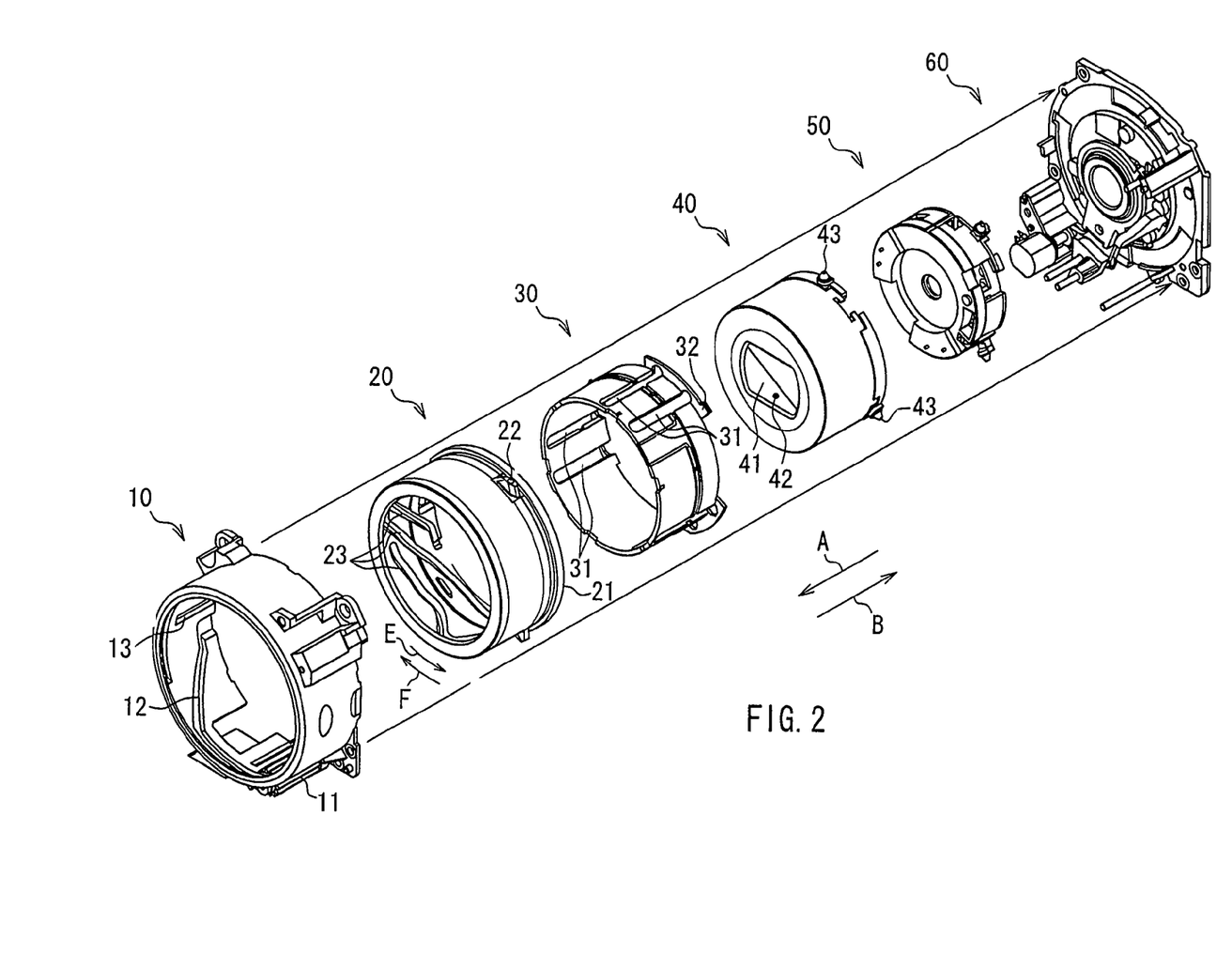
FIG. 2 is an exploded perspective view showing the imaging apparatus.

FIG. 2 is an exploded perspective view showing individual units constituting the imaging apparatus 1. As shown in FIG. 2, the imaging apparatus 1 includes the fixed frame 10, the drive frame 20, a rectilinear frame 30, the first group unit 40, a second group unit 50 and a base 60. Incidentally, in the description below, an outer peripheral surface of a cylindrical portion in substantially cylindrical members such as the fixed frame 10, the drive frame 20 and the rectilinear frame 30 is referred to as an "outer surface," and an inner peripheral surface of the cylindrical portion therein is referred to as an "inner surface."

The inner surface of the fixed frame 10 is provided with cam grooves 12. The fixed frame 10 is fixed to a chassis (not shown) of the imaging apparatus 1 together with the base 60. It is preferable to provide a plurality of the cam grooves 12. In the present embodiment, three cam grooves 12 are provided. Further, the inner surface of the fixed frame 10 is provided with a rectilinear groove 13 substantially in parallel with an optical axis direction.

The drive frame 20 is disposed inside the fixed frame 10. Also, the drive frame 20 is provided in such a manner as to be rotatable in a circumferential direction and movable in the optical axis direction. The drive frame 20 is movable between a position at which it is received in the fixed frame 10 and a position at which it partially protrudes in the optical axis direction beyond the fixed frame 10. Additionally, the outer surface of the drive frame 20 is provided with cam followers 22. It is preferable to provide a plurality of the cam followers 22. In the present embodiment, the number of the cam followers 22 is three, which is the same as the number of the cam grooves 12. The cam followers 22 are fitted movably in the cam grooves 12 formed in the fixed frame 10. Further, the inner surface of the drive frame 20 is provided with a plurality of cam grooves 23. The outer surface of the drive frame 20 is provided with a rack 21 along the circumferential direction. The rack 21 is in engagement with the gear 11 when the drive frame 20 is attached to the fixed frame 10. In this way, by rotating the gear 11 in the direction indicated by the arrow C or the arrow D, it is possible to rotate the drive frame 20 in a direction indicated by an arrow E or an arrow F.

The rectilinear frame 30 is disposed inside the drive frame 20. Also, the rectilinear frame 30 is provided in such a manner as to be rotatable in the circumferential direction. Further, the rectilinear frame 30 is provided so as to move together with the drive frame 20 when the drive frame 20 moves in the direction indicated by the arrow A or the arrow B (see FIG. 1). Moreover, a plurality of elongated holes 31 are formed in the cylindrical portion of the rectilinear frame 30. The elongated holes 31 are formed in such a manner as to be substantially in parallel with the optical axis direction of the rectilinear frame 30 and to penetrate from the outer surface to the inner surface of the rectilinear frame 30. The outer surface of the rectilinear frame 30 is provided with a cam follower 32. The cam, follower 32 is fitted movably in the rectilinear groove 13 in the fixed frame 10.

The first group unit 40 is disposed inside the rectilinear frame 30. Also, the first group unit 40 includes an objective lens, etc. Further, the first group unit 40 has at its end face in the optical axis direction the lens barrier 41 capable of opening and closing the opening 42. The outer surface of the first group unit 40 is provided with a plurality of cam followers 43. The cam followers 43 are fitted movably in the cam grooves 23 formed in the drive frame 20 through the elongated holes 31 formed in the rectilinear frame 30. Accordingly, the drive frame 20 rotates in the direction indicated by the arrow E or the arrow F, whereby the first group unit 40 moves in the optical axis direction.

The second group unit 50 includes a shutter unit, a second group lens, etc.

The base 60 is fixed to a chassis (not shown) of the imaging apparatus 1. Further, the base 60 includes a focus lens, an imaging device, etc.

Incidentally, the fixed frame 10 is an example of a first frame. The drive frame 20 is an example of a second frame. Also, the directions indicated by the arrow A and the arrow B are substantially in parallel with the optical axis of the imaging apparatus 1. The directions indicated by the arrow E and the arrow F are circumferential directions, with the optical axis of the imaging apparatus 1 serving as the center.

In the following, the operation will be explained.

The collapsed state shown in FIG. 1 corresponds to a power-off state of a digital camera including the imaging apparatus 1. In the imaging apparatus 1 in the collapsed state shown in FIG. 1, the drive frame 20, the rectilinear frame 30, the first group unit 40 and the second group unit 50 are received in the fixed frame 10. Further, the lens barrier 41 is closed.

Turning on the power of the digital camera in this state causes the driving means such as the motor to be energized and start driving. When the motor starts driving, the gear 11, which is in direct or indirect engagement with an output shaft of the motor, rotates in the direction indicated by the arrow C. By the rotation of the gear 11 in the direction indicated by the arrow C, the drive frame 20 rotates in the direction indicated by the arrow E because the gear 11 and the rack 21 are in engagement with each other. The rotation of the drive frame 20 causes the cam followers 22 to move inside the cam grooves 12, whereby the drive frame 20 moves in the direction indicated by the arrow A by the cam driving of the cam grooves 12 and the cam followers 22. In other words, the drive frame 20 moves from the collapsed state shown in FIG. 1 in the direction indicated by the arrow A while rotating in the direction indicated by the arrow E. Moreover, since the cam follower 32 is fitted in the rectilinear groove 13, the rectilinear frame 30 moves in the direction indicated by the arrow A along with the movement of the drive frame 20 in the direction indicated by the arrow A.

Furthermore, by the rotation of the drive frame 20 in the direction indicated by the arrow E, the cam followers 43 move inside the cam grooves 23, so that first group unit 40 moves in the direction indicated by the arrow A. Here, the rectilinear frame 30 moves in the direction indicated by the arrow A together with the drive frame 20 while its rotation in the circumferential direction is restricted due to the fact that the cam follower 32 is fitted in the rectilinear groove 13.

Incidentally, the recognition of an operating state of various operating means such as a power supply switch in the digital camera and the control of individual portions in the digital camera are executed by a control means such as a control microcomputer.

By the operation described above, it is possible to move the drive frame 20, the rectilinear frame 30 and the first group unit 40 to the position protruding beyond the fixed frame 10 in the direction indicated by the arrow A. This state corresponds to an image capturing standby state. When a user operates a zoom switch (not shown) mounted in the digital camera in the image capturing standby state, the control means controls a zoom lens (not shown) to move in the optical axis direction and perform a zooming operation. Incidentally, although the digital camera including the imaging apparatus 1 can execute not only the zooming operation but also a focusing operation, an image capturing operation, etc., the description thereof will be omitted in the instant specification.

2. Structures of the Cam Grooves 12 and the Cam Followers 22

Figure 3:
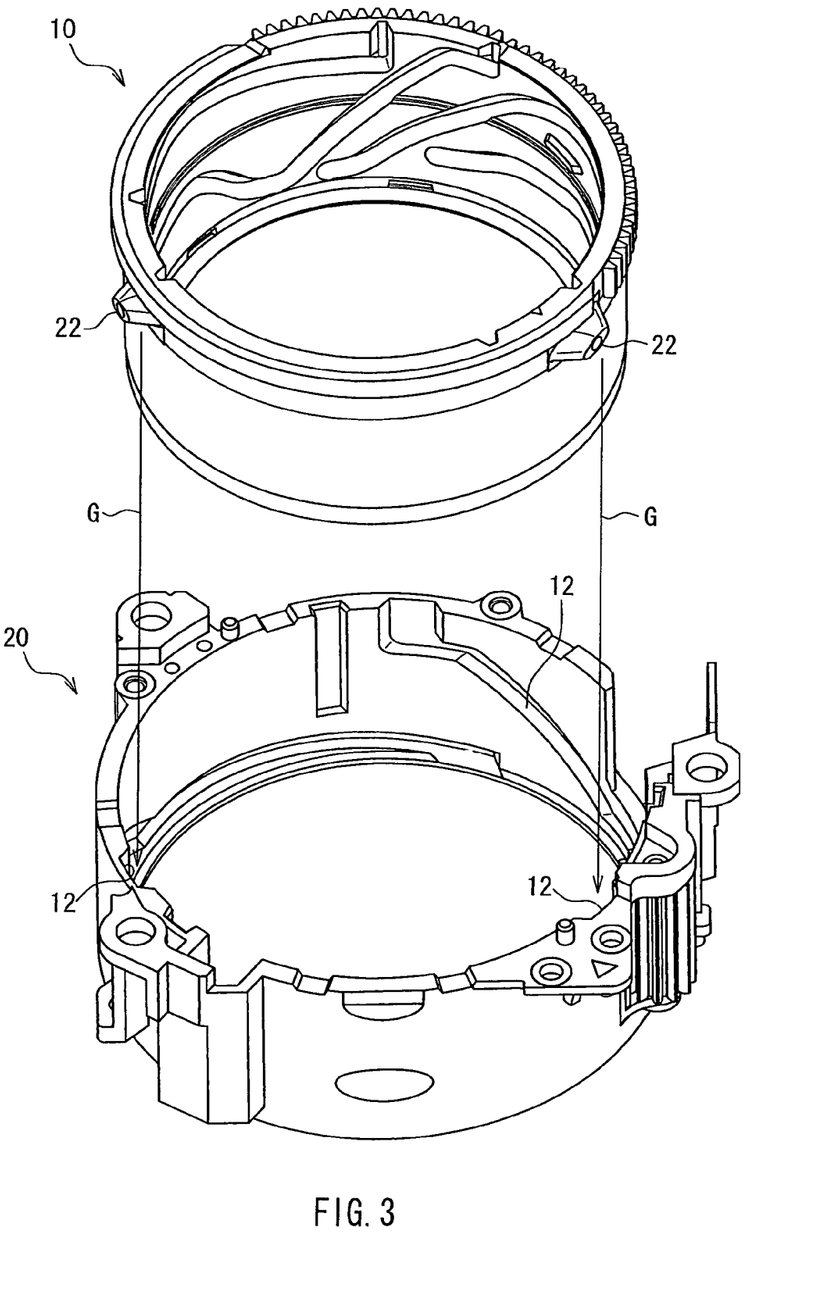
FIG. 3 is a perspective view showing structures of a fixed frame and a drive frame.

FIG. 3 shows the structures of the fixed frame 10 and the drive frame 20. As shown in FIG. 3, the inner surface of the fixed frame 10 is provided with three cam grooves 12. The outer surface of the drive frame 20 is provided with three cam followers 22. At the time of receiving the drive frame 20 inside the fixed frame 10, the cam followers 22 are fitted in the cam grooves 12, whereby the drive frame 20 becomes ready for the cam driving with, respect to the fixed frame 10 and movable in the optical axis direction relative to the fixed frame 10.

Figure 4:
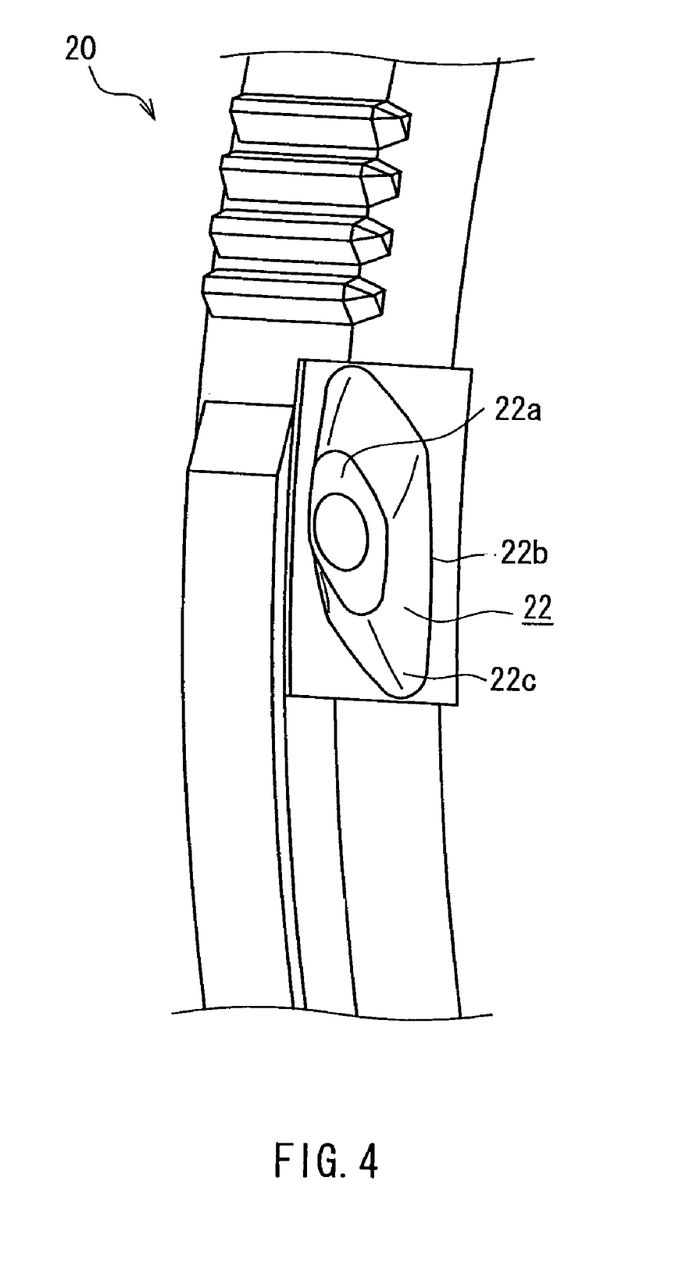
FIG. 4 is a perspective view mainly showing the vicinity of a cam follower in the drive frame.
Figure 5:
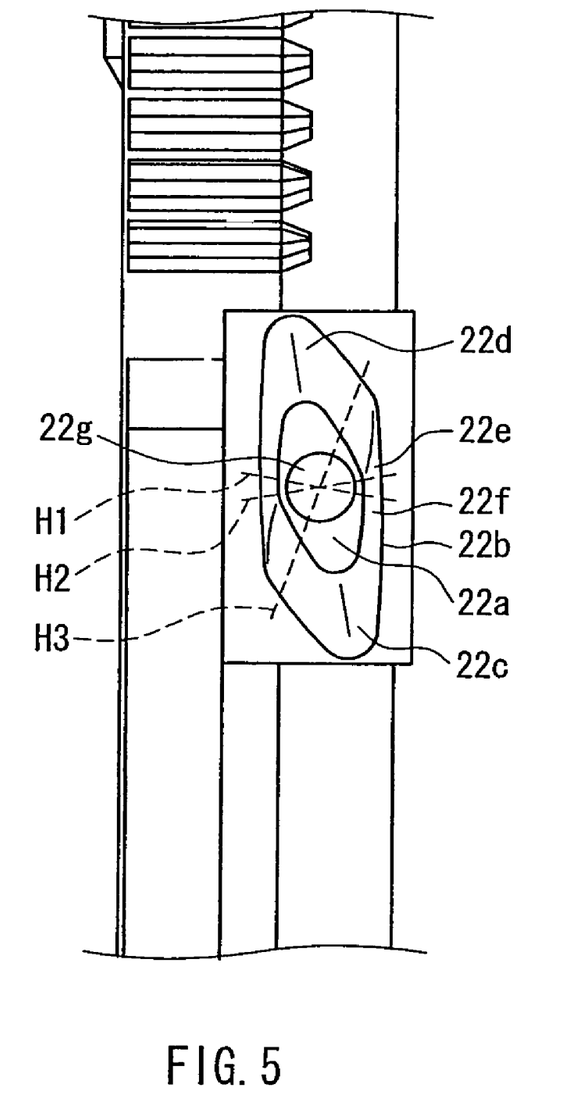
FIG. 5 is a plan view mainly showing the vicinity of the cam follower in the drive frame.
Figure 6A:
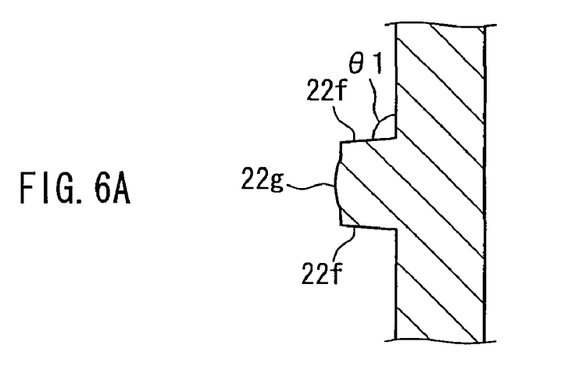
FIG. 6A shows a cross-section taken at a portion H1 in FIG. 5.
Figure 6B:
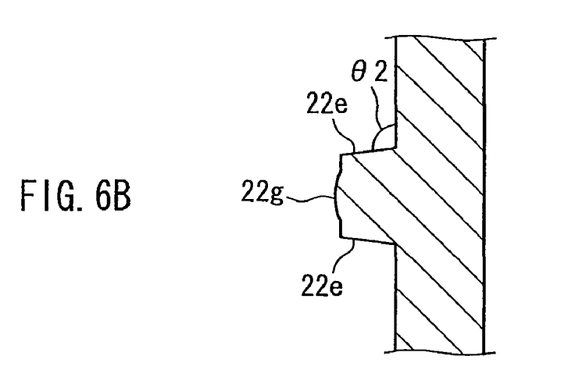
FIG. 6B shows a cross-section taken at a portion H2 in FIG. 5.
Figure 6C:
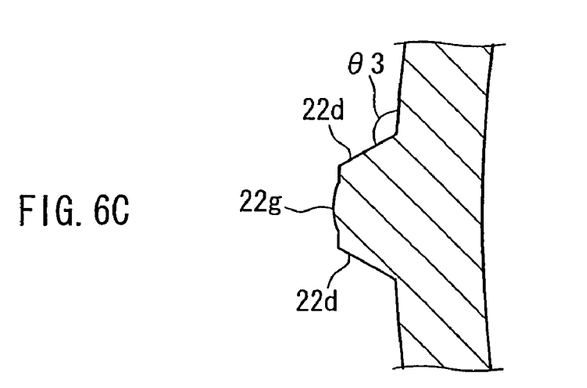
FIG. 6C shows a cross-section taken at a portion H3 in FIG. 5.

FIG. 4 is an enlarged perspective view showing the vicinity of the cam follower 22 in the drive frame 20. FIG. 5 is an enlarged plan view showing the vicinity of the cam follower 22 in the drive frame 20. As shown in FIGS. 4 and 5, the cam follower 22 is formed such that a top surface 22a and a bottom surface 22b thereof have a non-circular shape when viewed from above. The top surface 22a and the bottom surface 22b only have to have at least two diameters and are formed to have a substantially elliptical shape in the present embodiment. Further, the cam follower 22 is formed such that the bottom surface 22b has a larger area than the top surface 22a, and a plane linearly connecting edges of the top surface 22a and the bottom surface 22b is inclined (an inclined surface 22c). In other words, a vertical section of the cam follower 22 has a substantially trapezoidal shape as illustrated in FIGS. 6A to 6C. Additionally, the top surface of the cam follower 22 is provided with a substantially part-spherical protrusion 22g. The protrusion 22g can contact a bottom surface 12m of the cam groove 12 at least when the cam follower 22 moves inside the cam groove 12. This makes it possible to reduce a contact area between the protrusion 22g and the bottom surface 12m. Consequently, the sliding resistance during the movement of the cam follower 22 can be reduced, thereby achieving smooth cam driving.

FIG. 6A illustrates a cross-section taken at a portion H1 in FIG. 5. FIG. 6B illustrates a cross-section taken at a portion H2 in FIG. 5. FIG. 6C illustrates a cross-section taken at a portion H3 in FIG. 5. As shown in FIGS. 6A to 6C, the inclined surface 22c includes a first lateral surface 22d (see FIG. 6C), a second lateral surface 22e (see FIG. 6B) and a third lateral surface 22f (see FIG. 6A) that have different inclination angles from each other. When θ3 indicates the inclination angle of the first lateral surface 22d, θ2 indicates the inclination angle of the second lateral surface 22e and θ1 indicates the inclination angle of the third lateral surface 22f, $$\theta1 \leq \theta2 < \theta3$$

is satisfied.

Figure 7:
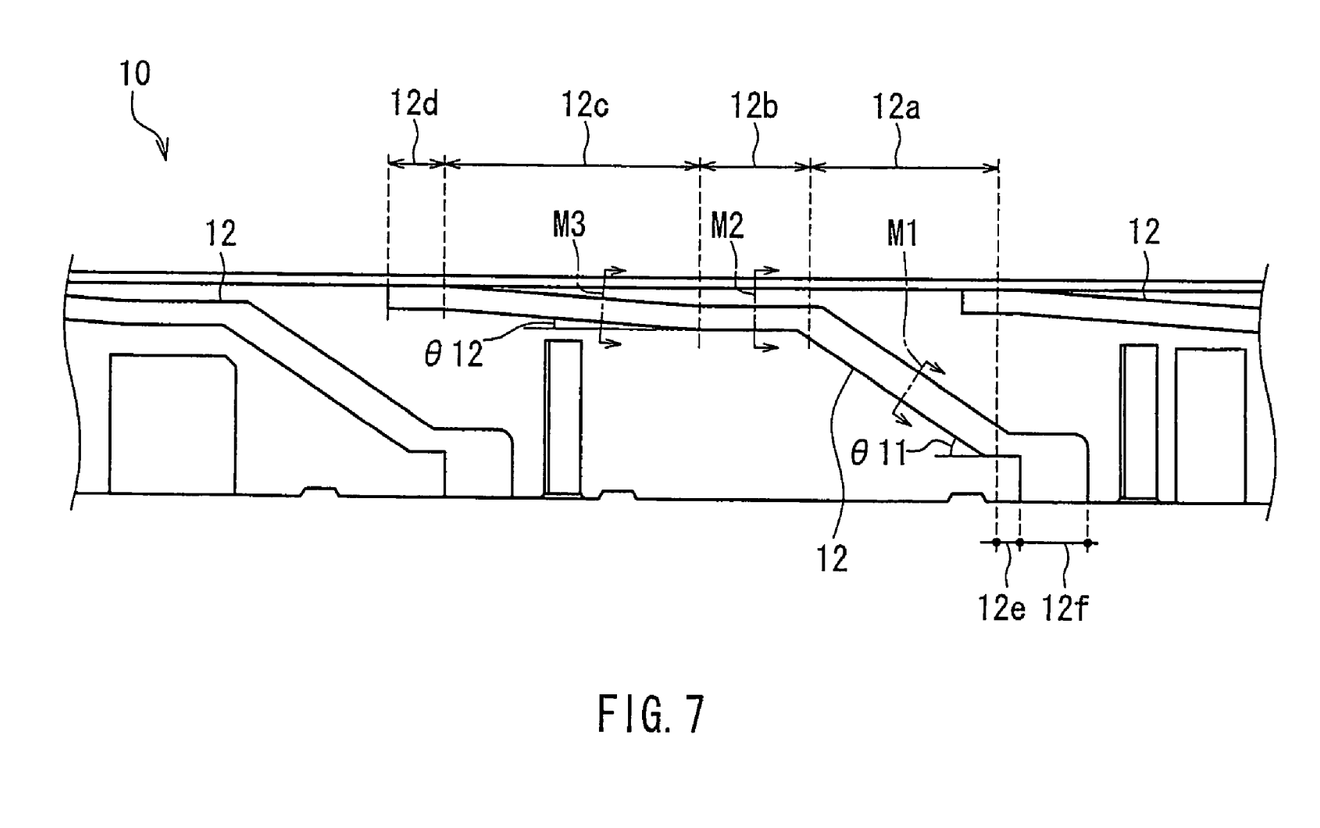
FIG. 7 is a schematic view showing a structure of an inner surface of the fixed frame.

FIG. 7 is a developmental view of the fixed frame 10, showing an inner structure of the fixed frame 10. Each of the cam grooves 12 includes first to sixth regions. The first region 12a corresponds to a moving range of the cam follower 22 when the drive frame 20 shifts from the collapsed state to the image capturing standby state. The second region 12b corresponds to a moving range of the cam follower 22 in the image capturing standby state. The third region 12c corresponds to a moving range of the cam follower 22 when an optical zooming operation is carried out. The fourth region 12d corresponds to a moving range of the cam follower 22 when the zoom lens in the optical zooming operation is at a telephoto end. The fifth region 12e corresponds to a moving range of the cam follower 22 in the collapsed state. The sixth region 12f is a region for inserting the cam follower 22 in the cam groove 12. Further, in each of the regions, the cam groove 12 is set to have an optimal inclination angle with respect to the circumferential direction of the fixed frame 10 and an optimal groove width.

Figure 8A:
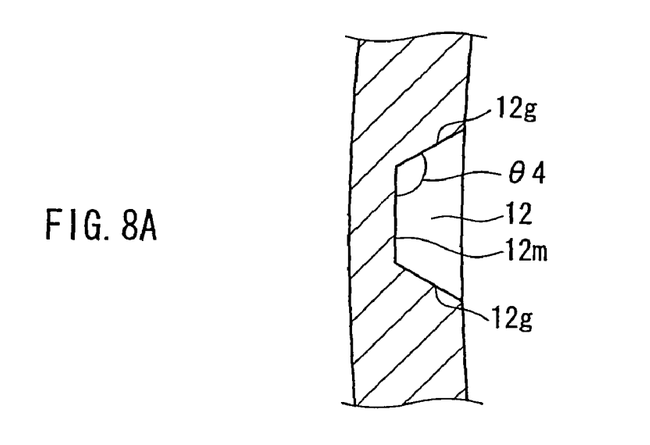
FIG. 8A shows a cross-section taken at a portion M1 in FIG. 7.
Figure 8B:
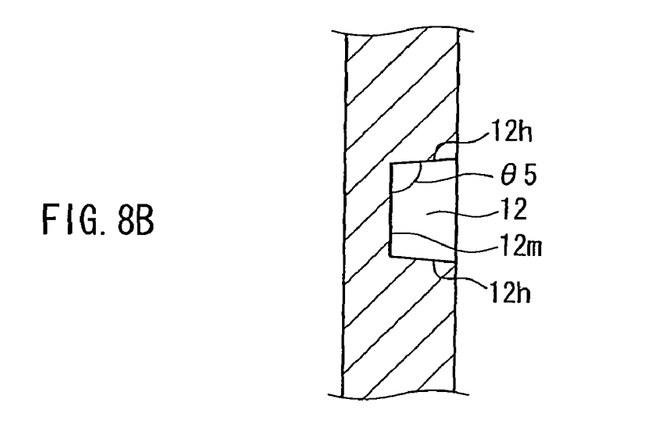
FIG. 8B shows a cross-section taken at a portion M2 in FIG. 7.
Figure 8C:
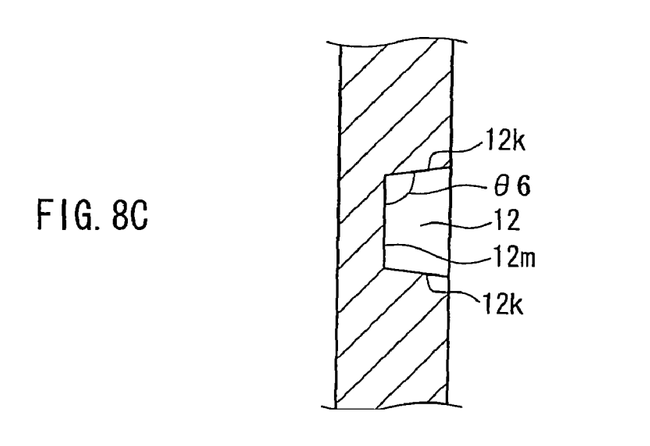
FIG. 8C shows a cross-section taken at a portion M3 in FIG. 7.

FIG. 8A illustrates a cross-section taken at a portion M1 in FIG. 7. FIG. 8B illustrates a cross-section taken at a portion M2 in FIG. 7. FIG. 8C illustrates a cross-section taken at a portion M3 in FIG. 7. As shown in FIGS. 8A to 8C, the cam groove 12 includes a first lateral surface 12g (see FIG. 8A), a second lateral surface 12h (see FIG. 8B) and a third lateral surface 12k (see FIG. 8C) that have different inclination angles from each other. When θ4 indicates the inclination angle of the first lateral surface 12g, θ5 indicates the inclination angle of the second lateral surface 12h and θ6 indicates the inclination angle of the third lateral surface 12k, $$\theta6 \leq \theta5 < \theta4$$

is satisfied.

The cam groove 12 in the first region 12a is wider than that in the second region 12b and the third region 12c. Also, an inclination angle θ11 of the cam groove 12 in the first region 12a is larger than the inclination angles thereof in the other regions. When the cam follower 22 moves inside the first region 12a, movable members such as the drive frame 20, etc. in the imaging apparatus 1 move between the collapsed state (see FIG. 1) and an expanded state.

Moreover, as shown in FIG. 8A, the inclination angle of the lateral surface 12g of the cam groove 12 in the first region 12a forms a large angle with respect to a depth direction of the cam groove 12. This angle is about 20°, for example. In other words, the angle θ4 between the lateral surface 12g and the bottom surface 12m is about 110°.

Also, in the first region 12a, the lateral surface 12g of the cam groove 12 contacts the first lateral surface 22d of the cam follower 22 (see FIGS. 5 and 6). The inclination angle of the first lateral surface 22d is substantially the same as that of the lateral surface 12g. Therefore, the cam follower 22 can move inside the first region 12a without looseness.

Next, in the second region 12b and the fourth region 12d, the cam groove 12 is formed substantially in parallel with the circumferential direction of the fixed frame 10. Accordingly, when the cam follower 22 moves inside the second region 12b and the fourth region 12d, the drive frame 20 does not move in the optical axis direction.

Further, the third region 12c is formed by the cam grooves 12 having an inclination angle θ12 with respect to the circumferential direction of the fixed frame 10 (θ12<θ11). Thus, when the cam follower 22 moves inside the third region 12c, the drive frame 20 slightly moves in the optical axis direction. Incidentally, when the cam follower 22 moves inside the second region 12b, the third region 12c and the fourth region 12d, the imaging apparatus 1 can change an optical zooming factor.

Moreover, as shown in FIG. 8B, the inclination angle of the lateral surface 12h of the cam groove 12 in the second region 12b forms a small angle with respect to the depth direction of the cam groove 12. The inclination angle of the lateral surface 12h is about 5°, for example. In other words, the angle θ5 between the lateral surface 12h and the bottom surface 12m is about 95°. It should be noted that the inclination angle of the lateral surface of the cam groove 12 in the fourth region 12d is equivalent to the inclination angle θ5 shown in FIG. 8B.

Furthermore, as shown in FIG. 8C, the inclination angle of the lateral surface 12k of the cam groove 12 in the third region 12c forms a small angle with respect to the depth direction of the cam groove 12. The inclination angle of the lateral surface 12k is about 5°, for example. In other words, the angle θ6 between the lateral surface 12k and the bottom surface 12m is about 95°. It should be noted that the angle θ6 may be made slightly smaller than the angle θ5.

Further, when the cam follower 22 moves inside the third region 12c, the lateral surface 12k constantly contacts the second lateral surface 22e of the cam follower 22. Also, when the cam follower 22 moves inside the second region 12b and the fourth region 12d, the lateral surface 12h constantly contacts the third lateral surface 22f of the cam follower 22. Consequently, the cam follower 22 can move inside the cam groove 12 in the second region 12b, the third region 12c and the fourth region 12d without looseness.

In addition, the groove width of the cam groove 12 and the inclination angle of the lateral surface thereof in the fifth region 12e are equivalent to those in the second region 12b. When the cam follower 22 is located in the fifth region 12e, the movable members such as the drive frame 20, etc. are in the collapsed state.

The following is a description of a moving operation of the cam follower 22 when the imaging apparatus 1 is operated.

Figure 9:
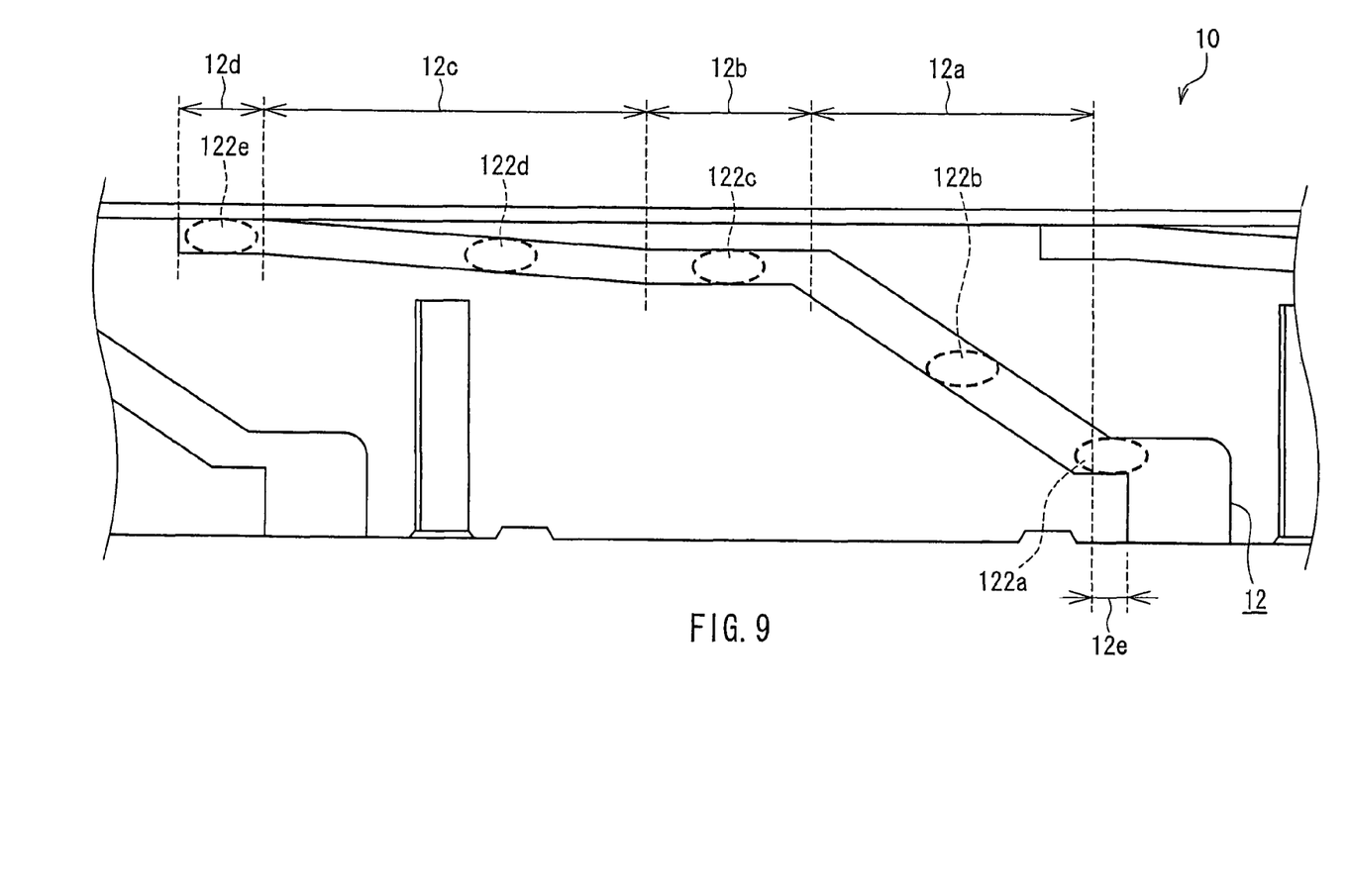
FIG. 9 is a schematic view mainly showing the vicinity of a cam groove in the fixed frame.

FIG. 9 is a drawing for describing the moving operation of the cam follower 22, which shows part of the inner surface of the fixed frame 10. In FIG. 9, numerals 122a to 122e indicate positions of the cam follower 22.

First, in the power-off state of the digital camera, the cam follower 22 is located in the fifth region 12e as indicated by the position 122a. At this time, the third lateral surface 22f (see FIG. 6A) of the cam follower 22 contacts the lateral surface of the cam groove 12, thereby suppressing the generation of looseness.

Next, when the power of the digital camera is turned on, the control means (not shown) controls the motor (not shown) to start driving. Then, a driving force of the motor is transmitted via the gear 11 (see FIG. 2) and the rack 21 (see FIG. 2) to the drive frame 20. In this way, the drive frame 20 rotates in the direction indicated by the arrow E. At this time, the cam follower 22 moves from the position 122a into the first region 12a. Since the cam groove 12 in the first region 12a is formed so as to be inclined at a large angle with respect to the circumferential direction of the fixed frame 10, the drive frame 20 moves in the direction indicated by the arrow A (see FIG. 2) while the cam follower 22 is moving inside the first region 12a. Also, when the cam follower 22 is located in the first region 12a, the first lateral surface 22d (see FIG. 6C) contacts the first lateral surface 12g (see FIG. 8A) of the cam groove 12, thereby suppressing the generation of looseness.

When the cam follower 22 arrives in the second region 12b (for example, at the position 122c), the control means (not shown) stops the driving of the motor so as to stop the rotational operation of the drive frame 20. When the cam follower 22 is located at the position 122c, the zoom lens is at a wide angle end. When the cam follower 22 is located in the second region 12b, the third lateral surface 22f (see FIG. 6A) contacts the second lateral surface 12h (see FIG. 8B) of the cam groove 12, thereby suppressing the generation of looseness.

Subsequently, when the zoom switch (not shown) of the digital camera is operated, the control means controls the motor to perform driving again. By the driving of the motor, the drive frame 20 further is driven rotationally in the direction indicated by the arrow E, and the cam follower 22 moves from the position 122c into the third region 12c. When the cam follower 22 is located in the third region 12c (for example, at the position 122d), the second lateral surface 22e (see FIG. 6B) contacts the third lateral surface 12k (see FIG. 8C) of the cam groove 12, thereby suppressing the generation of looseness.

When the zoom lens is moved to the telephoto end, the cam follower 22 is located in the fourth region 12d (for example, at the position 122e). At this time, the third lateral surface 22f (see FIG. 6A) of the cam follower 22 contacts the lateral surface (equivalent to the second lateral surface 12h shown in FIG. 8B) of the cam groove 12, thereby suppressing the generation of looseness.

Also when the zoom lens moves from the telephoto end to the wide angle end, the lateral surface of the cam follower 22 constantly contacts the lateral surface of the cam groove 12 in each of the fourth region 12d, the third region 12c and the second region 12b, so that the cam follower 22 moves inside the cam groove 12 while suppressing the generation of looseness.

When an instruction of turning off the power of the digital camera is inputted in the state where the cam follower 22 is located in any of the second region 12b, the third region 12c and the fourth region 12d, the control means controls the motor to perform driving. The motor performs driving in a reversed direction of rotation, thus driving the drive frame 20 rotationally in the direction indicated by the arrow F (see FIG. 2). In this way, the cam follower 22 moves inside the cam groove 12 toward the fifth region 12e. Since the lateral surface of the cam follower 22 and the lateral surface of the cam groove 12 contact each other constantly during the movement of the cam follower 22 toward the fifth region 12e, the cam follower 22 moves inside the cam groove 12 while suppressing the generation of looseness. When the cam follower 22 arrives in the fifth region 12e, the movable members such as the drive frame 20, etc. reach the collapsed state shown in FIG. 1.

3. Effects of the Embodiment, etc.

According to the present embodiment, in the first region 12a to the fifth region 12e, wherever the cam follower 22 is located, the lateral surface of the cam groove 12 and the lateral surface of the cam follower 22 contact each other constantly, so that no looseness is generated between the cam groove 12 and the cam follower 22. Therefore, the drive frame 20 and various lenses accompanying the drive frame 20 can be driven with high accuracy. Also, it is possible to suppress the generation of noise resulting from the looseness.

Further, the inclination angle of the lateral surface of the cam groove 12 in the second region 12b, the third region 12c and the fourth region 12d and the inclination angles of the second lateral surface 22e and the third lateral surface 22f of the cam follower 22 are set to be small. Consequently, even when a large external force due to impact from dropping or the like is applied when the cam follower 22 is located in the regions in which the optical zooming can be changed (the second region 12b, the third region 12c and the fourth region 12d), the cam follower 22 does not demate from the cam groove 12 easily, resulting in an improved impact resistance. When the cam follower 22 is located in the second region 12b, the third region 12c and the fourth region 12d, a user actually is using the digital camera. Thus, it is of significant importance to improve the impact resistance.

Moreover, the inclination angle of the lateral surface 12g of the cam groove 12 in the first region 12a forms a large angle with respect to the depth direction of the cam groove 12. Accordingly, it is possible to provide a die for forming the fixed frame 10 with a large draft. This facilitates the extraction of an inner die for forming the fixed frame 10 from a casting. Also, since it can be made easier to extract the inner die from the casting, the number of split of the inner die can be reduced. Therefore, the production is easy. In the case of a casting whose inner lateral surface is provided with the cam grooves 12, the inner die has to be split into plural parts and extracted inwardly after casting. In this case, reducing the number of splits of the inner die leads to a reduced cost for the die, thus making it easier to produce the casting.

It should be noted that the number of the cam grooves 12 and the number of the cam followers 22 are not limited to those in the present embodiment. Also, the shape, angle, width, etc. of the cam grooves 12 are not limited to those in the present embodiment. Further, although the cam followers 22 have a substantially elliptical shape in the present embodiment, they also may have other shapes as long as at least two outer diameters are present.

Although the present embodiment is directed to the configuration of the imaging apparatus 1 shown in FIG. 2, there is no particular limitation to this configuration.

The present invention can be applied to a movable body driving mechanism that is capable of moving by cam driving. More specifically, the present invention is applicable to a lens barrel or the like mounted in a digital still camera, a video camera, a mobile telephone terminal with a camera function, or the like.

[Note 1]

The present invention is directed to a movable body driving mechanism including a first frame and a second frame that is capable of moving relative to the first frame. The movable body driving mechanism includes a cam groove that is formed in the first frame, and a cam follower that is formed in the second frame and inserted movably in the cam groove. The cam groove includes a plurality of regions having different widths. The cam follower is formed to have a shape with a plurality of outer diameters, and different parts of the cam follower contact an inner lateral surface of the cam groove in each of the plurality of regions.

With this configuration, the lateral surface of the cam follower can be made to contact the lateral surface of the cam groove constantly, thus achieving the cam driving without looseness. Also, since the biasing means or the like is not needed, it is possible both to simplify the configuration and to reduce the number of manufacturing steps.

Incidentally, the fixed frame 10 in the present embodiment is an example of the first frame. The drive frame 20 is an example of the second frame.

[Note 2]

In the movable body driving mechanism according to the present invention, the cam follower can have a protruding shape whose outer diameter decreases from a side of the second frame toward a top portion. A lateral surface in a vertical section of the cam follower can have different inclination angles depending on a sectioned position.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An imaging apparatus comprising a lens barrel, with a first frame and a second frame that is capable of moving relative to the first frame, that is capable of forming a subject image by focusing incident light, the imaging apparatus comprising:
   a cam groove that is formed in the first frame and includes at least a first region and a second region that have different widths, and
   a cam follower that is formed in the second frame and inserted movably in the cam groove at least in the first region and the second region,
   wherein the cam follower is formed to have a shape with a plurality of outer diameters, and different parts of the cam follower contact an inner lateral surface of the cam groove depending on whether the cam follower is in the first region or in the second region,
   when the cam follower moves along the second region of the cam groove, the imaging apparatus is capable of capturing images, while when the cam follower moves along the first region of the cam groove, the imaging apparatus is not used for capturing images, and
   an inclination angle of a lateral surface of the cam groove in the first region is larger than an inclination angle of a lateral surface of the cam groove in the second region.

2. The imaging apparatus according to claim 1, wherein the cam follower has a protruding shape whose outer diameter decreases from a side of the second frame toward a top portion, and
   a lateral surface in a vertical section of the cam follower has different inclination angles depending on a sectioned position.

* * * * *